United States Patent [19]

Sano

[11] Patent Number: 4,495,300

[45] Date of Patent: Jan. 22, 1985

[54] METHOD FOR MANUFACTURE OF LOW THERMAL EXPANSION CORDIERITE CERAMICS

[75] Inventor: Shiro Sano, Nagoya, Japan

[73] Assignee: Agency of Industrial Science and Technology, Ministry of International Trade and Industry, Tokyo, Japan

[21] Appl. No.: 609,526

[22] Filed: May 14, 1984

Related U.S. Application Data

[63] Continuation of Ser. No. 431,560, Sep. 30, 1982, abandoned.

[30] Foreign Application Priority Data

Jan. 14, 1982 [JP] Japan .................................. 57-4155

[51] Int. Cl.³ ...................... C04B 35/18; C04B 35/20; C04B 35/48
[52] U.S. Cl. .................................. 501/102; 501/104; 501/105; 501/107; 501/119; 501/128; 501/151
[58] Field of Search .............. 501/102, 104, 105, 107, 501/118, 119, 127, 128, 151, 153, 9

[56] References Cited

U.S. PATENT DOCUMENTS

| | | | |
|---|---|---|---|
| 2,220,412 | 11/1940 | Kinzie et al. | 501/102 |
| 3,991,254 | 11/1976 | Takeuchi | 501/119 |
| 4,025,350 | 5/1977 | Walters et al. | 501/102 |
| 4,033,779 | 7/1977 | Winkler | 501/119 |
| 4,194,917 | 3/1980 | Sakemi et al. | 501/119 |
| 4,247,249 | 1/1981 | Siemers | 501/102 |
| 4,292,083 | 9/1981 | Rauch | 501/119 |
| 4,367,292 | 1/1983 | Sano et al. | 501/119 |
| 4,415,673 | 11/1983 | Feagin | 501/102 |

FOREIGN PATENT DOCUMENTS

| | | | |
|---|---|---|---|
| 38-18845 | 9/1963 | Japan | 501/107 |
| 49-18908 | 2/1974 | Japan . | |

OTHER PUBLICATIONS

Thrush, P. W. et al., "A Dictionary of Mining, Mineral and Related Terms"-Pub. by U.S. Dept. of Interior (1968) p. 1256, Ceramic Industry Jan. 1967, pp. 155-156.

Primary Examiner—Helen M. McCarthy
Attorney, Agent, or Firm—Oblon, Fisher, Spivak, McClelland & Maier

[57] ABSTRACT

A low thermal expansion cordierite ceramic is produced by combining cordierite with a zirconium compound and a phosphorus compound and sintering the resultant mixture thereby giving rise to zircon therein.

3 Claims, 4 Drawing Figures

METHOD FOR MANUFACTURE OF LOW THERMAL EXPANSION CORDIERITE CERAMICS

This application is a continuation of application Ser. No. 431,560, filed Sept. 30, 1982, now abandoned.

BACKGROUND OF THE INVENTION

This invention relates to a method for the manufacture of a low thermal expansion cordierite ceramic.

Generally, cordierite is a mineral having a composition represented by $2MgO.2Al_2O_3.5SiO_2$. It exhibits a very low thermal expansion coefficient over a wide range of temperatures and offers outstanding resistance to thermal shocks exerted by abrupt temperature changes. Owing to its excellent thermal stability, therefore, cordierite ceramics are widely adopted as refractory heat plates, as thermally resistant materials in laboratories, and as raw material for honeycomb structure bodies in heat exchangers of the recently developed type.

The sintering temperature at which cordierite is converted effectively into a ceramic is limited to a very narrow range. The practice of widening the range of sintering temperature by adding alumina, zirconia compound, or aluminum titanate to cordierite has found widespread acceptence for the purpose of eliminating the disadvantage due to the limited firing temperature range (Yoichi Shiraki: "Industrial Ceramics," page 313, Gihodo). Various studies are being made on the lowering of the thermal expansion coefficient of the sintered product of cordierite, namely cordierite ceramics.

One example of a technique for improving ceramics by the use of zircon is described here.

Since zircon avoids appreciably increasing the thermal expansion of cordierite ceramics and, moreover, enjoys thermal stability, the practice of adding this substance to cordierite has been gaining acceptance and yielding favorable results (Research Notes of the Kyoto Municipal Research Institute of Industry, page 3, June, 1978.) The addition of zircon, however, entails a disadvantage that the thermal expansion of the cordierite ceramics increases in proportion as the proportion of zircon to be added to the total amount of cordierite is increased. Even when the zircon to be added is as finely divided as the commercially available zircon flour, it is difficult for the cordierite to be sintered to an extent such that the produced product, namely cordierite ceramics, will assume a state having absolutely no water absorption coefficient. In the case of zircon sand now in popular use, since it contains iron as an impurity and has high hardness, cordierite incorporating such zircon sand cannot produce good cordierite ceramics.

Method for producing low thermal expansion cordierite have been produced by U. S. Pat. Nos. 4,033,779 and 4,194,917.

The former method resides in incorporation of $Al_2O_3$.

The latter method resides in incorporation of $Y_2O_3$, $CeO_2$, and $La_2O_3$.

With these methods however, the following faults are found. In the former method, regulation of particle size is difficult. In the latter method, the rare elements are expensive.

An object of this invention is to provide an inexpensive method for the manufacture of a low thermal expansion cordierite ceramics which exhibits a very low thermal expansion coefficient and yet retains the outstanding thermal shock resistance of the cordierite.

SUMMARY OF THE INVENTION

The inventors carried out various studies for the purpose of realizing the object described above. They have consequently ascertained that this object is accomplished by causing cordierite, as the raw material, to incorporate therein zirconia thereby allowing this zirconia to be converted into zircon while the cordierite is being sintered during the course of manufacture of cordierite ceramics. They have completed the present invention based on this knowledge.

To be specific, this invention relates to a method for the manufacture of low thermal expansion cordierite ceramics, characterized by preparing zirconia or a zirconium compound capable of being converted by sintering into zirconia and phosphorus pentoxide or a phosphorus compound capable of being converted by sintering into phosphorus pentoxide in relative amounts representing a weight ratio of 1:1 to 5:1 as zirconia and phosphorus pentoxide respectively, adding the two compounds as prepared in the aforementioned weight ratio to cordierite in a combined amount of 2 to 25% by weight, as oxides respectively, based on the amount of cordierite, and sintering the resultant mixture at a temperature of 1200° to 1450° C. thereby giving rise to zircon in the sintered product.

DESCRIPTION OF THE PREFERRED EMBODIMENTS

Figure 1:
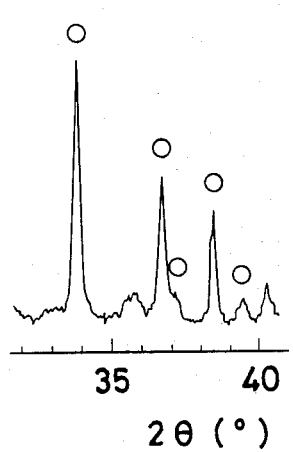
FIG. 1 is a graph obtained by subjecting to X-ray diffraction pattern (CuKα) cordierite ceramic which has been sintered without use of any additive.

This invention is identical with the aforementioned methods in respect that zircon is retained in the cordierite ceramics. This invention, however, is characterized by the manner in which the presence of zircon in the cordierite ceramics is brought about. In the present invention, zircon is produced from zirconia with phosphoric acid as a process in the firing. The zircon, therefore, is readily distributed densely throughout the whole texture of the produced cordierite ceramics. The cordierite ceramics produced as sintered in the manner described above exhibits thermal expansion totally different from the thermal expansion exhibited by the cordierite ceramics produced by the conventional method. In the cordierite ceramics produced from cordierite which already incorporates zircon before sintering, the thermal expansion increases in proportion as the amount of zircon so added is increased. By contrast, the cordierite ceramics produced by the method of this invention exhibit less thermal expansion owing to the occurrence of zircon than the cordierite ceramics containing no zircon.

For the produced cordierite ceramics to attain the aforementioned decrease of thermal expansion due to the presence of zircon, it is imperative that a zirconium compound and a phosphorus compound (in relative amounts representing a weight ratio of 1:1 to 5:1 as zirconia to phosphorus pentoxide) should be added to cordierite in a combined amount of 2 to 25% by weight as respective oxides based on the amount of cordierite and the sintering temperature should fall in the range of 1200° to 1450° C.

Theoretically cordierite ought to be composed of 13.7% of MgO, 34.9% of $Al_2O_3$, and 51.4% of $SiO_2$. In actuality, cordierite of any of various grades containing MgO in the range of 5 to 17% by weight, $Al_2O_3$ in the range of 30 to 45% by weight, and $SiO_2$ in the range of 43 to 60% by weight can be used for this invention. Even synthetic cordierite or a composition obtained by neat blending the components of cordierite in a stated ratio can be used in the present invention to produce the same results. By the expression "neat blending" is meant an operation of blending components in desired cordierite composition, so that the product is in a synthesized state yet to be fired.

In the case of mullite type cordierite which has a richer mullite component than the specific range of composition mentioned above, the formation of zircon is impeded and the cordierite is converted into mullite.

Zirconium and phosphorus used as additives to cordierite fail to manifest their effects when the combined amount of the additives thus added falls short of reaching 2% by weight as oxides based on the amount of cordierite. When the combined amount of the additives exceeds 25% by weight, their addition proves futile because the produced ceramics exhibit a large thermal expansion coefficient. In this invention, the zirconium compound and the phosphorus compound should be used in relative amounts which represent a weight ratio of 1:1 to 5:1 as zirconia to phosphorus pentoxide. When the weight ratio of the two compounds fails to fall within the range mentioned above, the formation of zircon is impeded and, at the same time, the thermal expansion coefficient is increased and the resistance to thermal shocks resistance is lowered.

The zirconium compound and phosphorus compound may be used in any form on the condition that they are converted by firing into their corresponding oxides, i.e. zirconia and phosphorus pentoxide. Examples of such zirconium compound and phosphorus compound are zirconium chloride, zirconium oxy-chloride, zirconium oxide, zirconium bromide, zirconium hydroxide, and zirconium fluoride, and phosphorus oxides, phosphorus bromide, phosphorus fluoride, and phosphoric acid. Because of ready availability and low cost, zirconium oxide and phosphoric acid prove to be particularly advantageous among other compounds.

When the firing temperature is less than 1200° C., the formation of zircon is not obtained. When it exceeds 1450° C., conversion of cordierite to mullite is accelerated. Thus, deviation of the firing temperature from the aforementioned range should be avoided.

The cordierite ceramics produced by the method of this invention enjoys low thermal expansion as a characteristic feature and, moreover, retains intact the characteristic properties such as resistance to thermal shocks, which are inherent in cordierite ceramics in general.

According to the method of the present invention, the range of the sintering temperature which is provided by water absorption less than 0.02% by weight and is ordinarily ±5° C. can be widened to ±15° C.

A sintered substance obtained by the method of the present invention, i.e. cordierite ceramic, is excellent in dielectric property at a high frequency (1 MHz) and exhibits high dielectric strength (at 60 Hz).

Figure 2:
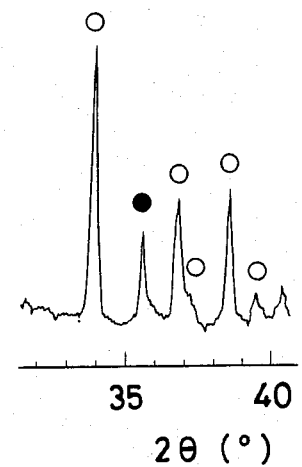
FIG. 2 is a graph obtained by subjecting to X-ray diffraction pattern (CuKα) cordierite ceramic which has been sintered with zirconia and phosphoric acid added in a molar ratio of 2:1 (phosphoric acid calculated as $P_2O_5$) in a total amount of 5% by weight based on the amount of cordierite.
Figure 3:
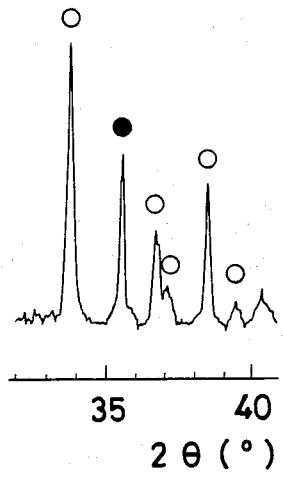
FIG. 3 is an X-ray diffraction pattern obtained when the amount of zirconia and phosphoric acid added is 10% by weight based on the amount of cordierite.
Figure 4:
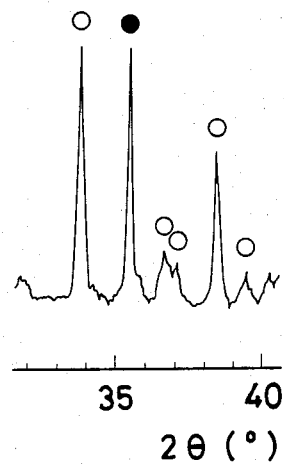
FIG. 4 is an X-ray diffraction pattern obtained when the amount of zirconia and phosphoric acid added is 15% by weight based on the amount of cordierite.

Cordierite ceramic manufactured by the method of this invention has been found to have the following properties. Sintered substances (cordierite ceramic) were prepared by adding zirconia and phosphoric acid in a molar ratio of 2:1 (phosphoric acid calculated as $P_2O_5$) with the additives varied in the total amount of 0%, 5%, 10% and 15% by weight based on the cordierite and were referred to as MAC-0, MAC-5, MAC-10 and MAC-15 respectively. These sintered substances were as subjected to X-ray diffraction pattern (CuKα). The results were shown in FIGS. 1 through 4, wherein •denotes $ZrO_2.SiO_2$ (zircon) and ∘ denotes $2MgO.2Al_2O_3.5SiO_2$ (cordierite). As will be understood from FIGS. 1 to 4, the greater the total amount of zirconia and phosphoric acid added, the greater the amount of zircon contained in the sintered substance. The physical properties of these sintered substances were as shown in Table 1 below.

TABLE 1

|  | Sintering temperature (°C.) | Water adsorption (%) | Cracking temperature (°C.) | Dielectric strength (KV/mm) |
|---|---|---|---|---|
| MAC-0 | 1370 | 2.5 | 450 | 7.8 |
| MAC-5 | 1370 | 0.0 | 550 | 10.7 |
| MAC-10 | 1350 | 0.0 | 600 | 10.0 |
| MAC-15 | 1340 | 0.0 | 550 | 11.3 |

|  | Dielectric constant | Dielectric loss (× $10^{-4}$) |
|---|---|---|
| MAC-0 | 5 | 7200 |
| MAC-5 | 4 | 100 |
| MAC-10 | 4 | 50 |
| MAC-15 | 4 | 50 |

As will be understood from Table 1 above, the electric properties, etc. are enhanced.

Now, the present invention will be described more specifically below with reference to working examples.

EXAMPLE 1

Cordierite ($2MgO.2Al_2O_3.5SiO_2$) was synthesized at 1350° C. by using Kongo Kaolin, Gairome clay, Talc, and $Al_2O_3$ of the respective compositions shown in Table 2. The produced cordierite was coarsely crushed and subjected to attrition with water in a pot mill for 24 hours to produce dry powder. Separately, a composition produced by neat blending the components of cordierite in a stated ratio was obtained in the form of dry powder.

TABLE 2

|  | $SiO_2$ | $Al_2O_3$ | $Fe_2O_3$ | CaO | MgO | $Na_2O$ | $K_2O$ | Ig. loss |
|---|---|---|---|---|---|---|---|---|
| Kongo Kaolin | 44.87 | 38.24 | 0.42 | 0.08 | 0.09 | 0.83 | 0.50 | 13.98 |
| Gairome clay | 49.01 | 31.96 | 1.38 | 0.14 | 0.08 | 0.54 | 2.29 | 13.50 |

TABLE 2-continued

|      | $SiO_2$ | $Al_2O_3$ | $Fe_2O_3$ | CaO  | MgO   | $Na_2O$ | $K_2O$ | Ig. loss |
|------|---------|-----------|-----------|------|-------|---------|--------|----------|
| Talc | 62.68   | 0.98      | 0.35      | 0.54 | 27.73 | 0.39    | 0.38   | 6.96     |
| $Al_2O_3$ | 0.07 | 99.5+  | 0.03      |      |       | 0.10    |        |          |

Then, $ZrO_2$ of high purity (99.5%) and $P_2O_5$ of reagent grade (99%) were blended in the two molar ratios, $ZrO_2:P_2O_5$, of 1:1 and 2:1, which correspond to weight ratios of 46.4:53.6 and 63.4:36.6. The blends were fired at 1300° to 1350° C. and added in varying amounts of 0 to 30% by weight to the aforementioned cordierites. The resultant mixtures were pelletized and fired at 1200° to 1450° C. for 1 hour in an electric furnace of SiC heating element.

The results are shown in Table 3, wherein the symbol G is used to synthetic cordierite, the symbol N cordierite produced by neat blending, the symbol ZP the $ZrO_2:P_2O_5$ ratio of 1:1, and the symbol $Z_2P$ the $ZrO_2:P_2O_5$ ratio of 2:1. For example, G-O indicates that the two oxides were added in an amount of 0% by weight to the synthetic cordierite and G-2.5 ZP indicates that the two oxides of a mixing ratio of 1:1 were added in a combined amount of 2.5% by weight to the synthetic cordierite.

The water immersion method mentioned above means an operation in which a test piece is heated to a prescribed temperature, immersed in water containing ethylene glycol and kept at 0° C., then dried, dyed, examined for occurrence of cracks with the aid of an immersion flaw-detecting agent and, on detection of no flaw, heated again at 50° C. higher than in the first heating, and similarly examined. This procedure is repeated until the test piece sustains cracks. The temperature at which the heated test piece sustains cracks is reported.

The results given in Table 3 indicate that addition of $ZrO_2$ and $P_2O_5$ in amounts falling in the range defined by this invention brought about reduction in average thermal expansion coefficient and improvement in resistance to thermal shocks.

EXAMPLE 2

To the same cordierite as used in Example 1, the same $ZrO_2$ as used in Example 1 and phosphoric acid (85% $H_3PO_4$ rated as super grade, specific gravity 1.7, equivalent to 61.6% of $P_2O_5$) were added. A mixture of $ZrO_2$ and $H_3PO_4$ prepared so as to have a $ZrO_2:P_2O_5$ molar ratio of 1:1 was added in varying amounts of 0 to 25% by weight to various types of cordierite. The resultant mixtures were thoroughly stirred, dried, and then tested similarly to Example 1. The results were as shown in Table 4. In this table, the symbol C is used to synthetic cordierite, the symbol $C_2$ the cordierite produced by neat blending, and the symbol ZH the mixture of $ZrO_2$ and $H_3PO_4$. The numerals attached to CZH and $C_2ZH$ represent the total amounts, in weight %, of $ZrO_2$ and $H_3PO_4$, calculated as $P_2O_5$, added to the respective cordierite species. For example, CZH-2.5 indicates that zirconia and phosphoric acid (mixed in a molar ratio, $ZrO_2: P_2O_5$, of 1:1) were added in a combined amount of 2.5% to the synthetic cordierite, and $C_2ZH$-O indicates that the cordierite produced by neat blending alone was used.

TABLE 3

|          | Sintering temp. (°C.) | Average thermal expansion coefficient ($\times 10^{-6}$) | | | Cracks formed at (°C.) | Mineral identified by X-rays |
|----------|----|---|---|---|---|---|
|          |      | Room temp. to 300° C. | Room temp. to 600° C. | Room temp. to 950° C. |      |         |
| G-0      | 1400 | 1.4 | 2.3 | 3.0 | 400 | C       |
| G2.5ZP   | 1350 | 1.1 | 1.9 | 2.5 | 450 | C, ZS   |
| G-10ZP   | ″    | 1.3 | 2.1 | 2.7 | 500 | ″       |
| G-20ZP   | ″    | 1.4 | 2.3 | 2.8 | ″   | ″       |
| G-25Zp   | 1300 | 1.4 | 2.2 | 2.9 | ″   | ″       |
| G-30Zp   | 1280 | 1.5 | 2.4 | 3.2 | 400 | C, ZS, M |
| N-0      | 1400 | 1.4 | 2.3 | 2.8 | 400 | C       |
| N-2.5ZP  | ″    | 1.3 | 2.0 | 2.7 | 450 | C, ZS   |
| N-5Zp    | ″    | 1.2 | 1.8 | 2.4 | 500 | ″       |
| N-10ZP   | ″    | 0.5 | 1.8 | 2.3 | ″   | ″       |
| N-15ZP   | ″    | 0.4 | 1.3 | 1.9 | 550 | ″       |
| N-20Zp   | ″    | 1.0 | 1.5 | 2.2 | 500 | ″       |
| N-25Zp   | 1360 | 1.2 | 1.9 | 2.5 | 450 | ″       |
| N-30ZP   | 1320 | 1.5 | 2.4 | 3.0 | 350 | C, M    |
| G-5$Z_2$P | 1360 | 1.3 | 2.2 | 2.8 | 450 | C, ZS   |
| G-10$Z_2$P | 1360 | 1.3 | 2.1 | 2.8 | 450 | C, ZS   |
| G-15$Z_2$P | ″  | 1.1 | 2.0 | 2.7 | 500 | ″       |
| N-5$Z_2$P | 1400 | 1.3 | 1.9 | 2.5 | 450 | ″       |
| N-10$Z_2$P | ″   | 1.0 | 1.7 | 2.5 | ″   | ″       |
| N-15$Z_2$P | 1370 | 0.9 | 1.5 | 2.1 | 500 | ″       |

(Note)
The sintering temperature represents the optimum temperature for firing and the temperature at the occurrence of cracks represents the temperature determined by the water immersion method. In table, C stands for cordierite, ZS for zircon, and M for mullite.

TABLE 4

| | Sintering temp. (°C.) | Average thermal expansion coefficient ($\times 10^{-6}$) | | | Cracks formed at (°C.) | Mineral identified by X-rays |
|---|---|---|---|---|---|---|
| | | Room temp. to 300° C. | Room temp. to 600° C. | Room temp. to 900° C. | | |
| CZH-0 | 1380 | 0.4 | 1.8 | 2.6 | 450 | C |
| CZH-2.5 | 1350 | 0.3 | 1.7 | — | 450 | C |
| CZH-5 | " | 0.2 | 1.6 | 2.3 | 550 | C, ZS |
| CZH-0 | 1330 | " | " | — | " | " |
| CZH-10 | " | 0.4 | 1.7 | 2.6 | 500 | " |
| CZH-12.5 | " | " | 1.6 | " | " | " |
| CZH-15 | " | 1.1 | 2.0 | 2.7 | 450 | " |
| CZH-15 | 1300 | 1.3 | 2.1 | 2.9 | 400 | C, ZS, M |
| $C_2ZH$-0 | 1350 | 1.4 | 2.3 | 2.8 | 400 | C |
| $C_2ZH$-5 | " | 0.9 | 2.2 | 3.1 | 450 | C, ZS |
| $C_2ZH$-10 | " | 0.6 | 1.7 | 2.4 | 500 | " |
| $C_2ZH$-15 | " | 1.2 | 2.1 | 2.5 | " | " |
| $C_2ZH$-25 | 1320 | 1.4 | 2.3 | 2.7 | 400 | C, ZS, M |

EXAMPLE 3

With 100 g of synthetic mullite-containing cordierite having a composition of $2MgO.3Al_2O_3.8SiO_2$ and, therefore, consisting of 9.3% of MgO, 35.0% of $Al_2O_3$, and 55.7% of $SiO_2$ (synthesized at 1200° C), a gelled mixture obtained by adding 15 g of zirconium oxy-chloride ($ZrOCl_2.8H_2O$) and 2.8 cc of $H_3PO_4$ to 200 cc of water was thoroughly stirred.

The resultant mixture was dried, molded in the form of a disc, and sintered to produce a ceramic similarly to Example 1. The amounts of the additives used correspond to 5.7 g of $ZrO_2$ and 2.9 g of $P_2O_5$.

The results were as shown in Table 5.

TABLE 5

| | Sintering temp. (°C.) | Water absorption (%) | Average thermal expansion coefficient ($\times 10^{-6}$) at room temp. at 960° C. | Cracks formed at (°C.) | Mineral identified by X rays |
|---|---|---|---|---|---|
| No additive | 1420 | 0.10 | 2.1 | 400 | C, M |
| Additives | 1350 | 0.00 | 1.9 | 500 | C, ZS, M |

EXAMPLE 4

To a mullite-containing cordierite having a composition of $2MgO.5.7Al_2O_3.9.6SiO_2$ and, therefore, consisting of 6.5% of MgO, 47.0% of $Al_2O_3$, and 46.5% of $SiO_2$, zirconia and phosphorus pentoxide (mixed in a $ZrO_2:P_2O_5$ molar ratio of 1:1) were added in a combined amount of 10%. The resultant powdered mixture was molded in the form of a disc 2.8 mm in diameter under pressure of 750 kg/cm². The disc was tested similarly to Example 1.

The results were as shown in Table 6.

combined amount of 5% to the cordierite produced by neat blending. In this case, the former cordierite mixture converted to mullite at 1200° C. and the formation of zircon was not observed in the produced ceramic, and the latter cordierite mixture retained zirconia intact even when the firing temperature rose beyond 1450° C. and the conversion of zirconia to zircon was not observed.

EXAMPLE 5

The procedure of Example 2 was repeated, except that a mixture consisting of $ZrO_2$ and $H_3PO_4$ at a $ZrO_2:P_2O_5$ molar ratio of 2:1 was incorporated in varying proportions of 0 to 15% by weight. The samples were tested for thermal expansion coefficient at temperatures between room temperature and 500° C. The results are shown in Table 7.

TABLE 7

| | Sintering temp. (°C.) | Average thermal expansion coefficient ($\times 10^{-6}$) | | Mineral identified by X rays |
|---|---|---|---|---|
| | | Room temp. to 250° C. | Room temp. to 500° C. | |
| $CZ^2H$-0 | 1410 | 1.71 | 2.23 | C |
| $CZ^2H$-2.5 | 1360 | 0.81 | 1.96 | C, ZS |
| $CZ^2H$-5.0 | 1360 | 0.60 | 1.41 | C, ZS |
| $CZ^2H$-7.5 | 1350 | 1.05 | 1.69 | " |
| $CZ^2H$-10.0 | 1350 | 0.66 | 1.61 | " |
| $CZ^2H$-12.5 | 1350 | 0.60 | 1.61 | " |
| $CZ^2H$-15.0 | 1340 | 0.65 | 1.99 | " |

(Note)
$CZ^2H$-2.5: Synthetic cordierite + 2.5% (of a mixture consisting of $ZrO_2$ and $H_3PO_4$ at a $ZrO_2: P_2O_5$ molar ratio of 2:1).

COMPARATIVE EXPERIMENT 2

The procedure of Example 5 was repeated, except that $ZrO_2$, $H_3PO_4$, and $ZrO_2.SiO_2$ (natural powdery

TABLE 6

| | Sintering temp. (°C.) | Water absorption (%) | Average thermal expansion coefficient ($\times 10^{-6}$) | | | Mineral identified by X rays |
|---|---|---|---|---|---|---|
| | | | Room temp. to 300° C. | Room temp. to 600° C. | Room temp. to 950° C. | |
| No additive | 1420 | 0.21 | 1.4 | 2.7 | 3.2 | C, M |
| Additives | 1350 | 0.02 | 1.3 | 2.8 | 3.3 | M, C |

COMPARATIVE EXPERIMENT 1

The procedure of Example 1 was repeated, except that $ZrO_2$ and $P_2O_5$ were mixed in two weight ratios of 1:1.2 and 5.5:1 and the former mixture was added in a combined amount of 10% and the latter mixture in a zircon which showed only zircon diffraction line in the X-ray diffraction pattern) were incorporated each in an amount of 10% by weight (with $H_3PO_4$ as $P_2O_5$). The results are shown in Table 8.

TABLE 8

| Additive | Sintering temp. (°C.) | Average thermal expansion coefficient ($\times 10^{-6}$) | | Mineral identified by X rays |
| --- | --- | --- | --- | --- |
| | | Room temp. to 250° C. | Room temp. to 500° C. | |
| $ZrO_2$ | 1420 | 0.87 | 1.78 | C, $ZrO_2$ |
| $H_3PO_4$ | 1350 | 1.00 | 2.16 | C |
| $ZrO_2.SiO_2$ | 1430 | 1.45 | 2.49 | C, ZS |

What is claimed is:

1. A method for the manufacture of a low thermal expansion cordierite ceramic having an excellent dielectric property, which consists of preparing at least one zirconium compound selected from the group consisting of zirconium chloride, zirconium oxychloride, zirconium oxide, zirconium bromide, zirconium hydroxide and zirconium fluoride; and at least one phosphorus compound selected from the group consisting of phosphorus oxide, phosphorus bromide, phosphorus fluoride and phosphoric acid; in relative amounts representing a weight ratio of 1:1 to 5:1 as zirconia to phosphorus pentoxide; adding said zirconium compound and said phosphorus compound in said weight ratio to cordierite, which consists of 5 to 17% by weight of MgO, 30 to 45% by weight of $Al_2O_3$ and 43 to 60% by weight of $SiO_2$, in a combined amount of 2 to 25% by weight as the respective oxides, based on the amount of cordierite; and firing the resultant mixture at a temperature of 1200° C. to 1450° C., thereby giving rise to zircon in the sintered product.

2. A method according to claim 1, wherein said cordierite is synthetic cordierite.

3. A method according to claim 1, wherein said cordierite is cordierite produced by neat blending.

* * * * *